STABILIZING MEANS FOR SEMI-CONDUCTOR CIRCUITS

Filed March 31, 1954

INVENTOR.
Hung C. Lin
BY H. [signature]
ATTORNEY 2,802,071

STABILIZING MEANS FOR SEMI-CONDUCTOR CIRCUITS

Hung C. Lin, Levittown, Pa., assignor to Radio Corporation of America, a corporation of Delaware Application March 31, 1954, Serial No. 420,071

5 Claims. (Cl. 179—175)

This invention relates in general to signal conveying and other electrical circuits which utilize semi-conductor devices as active signal amplifying and translating elements, and in particular to means for stabilizing such circuits with temperature variations.

The development of commercially useful semi-conductor devices such as transistors has had a pronounced effect upon and has caused the introduction of many new techniques in the electronic signal communication field. Transistors have many advantages including their small size and durability, especially when compared with the ordinary vacuum tube. In addition, they require no heater power and consist of materials which appear to have a long useful life. Consequently, the use of transistors in signal conveying and other electrical circuits has been, and is, the subject of extensive investigation.

While possessing all of the above as well as other advantages, transistors are known to be highly temperature sensitive. Thus, variations in the ambient temperature as well as variations due to the power dissipation in the transistors themselves will affect their operation to a considerable extent in some cases. These temperature variations may cause changes in certain parameters and operating characteristics of the transistors to the extent that their operation may become unstable and, therefore, unreliable. Various methods and systems have been tried in an attempt to compensate for these undesirable changes. Most of the known methods have not been found to compensate for temperature variations as adequately and completely as needed for most efficient operation.

It is known that for most efficient operation and minimum distortion, a transistor requires a certain optimum forward bias voltage between its emitter and base electrodes. Furthermore, it has been found that this biasing voltage is very sensitive to changes in temperature. Accordingly, unless provision is made to compensate for the changing requirements of the forward emitter-to-base voltage with temperature changes, distortion will result and the direct current collector current will change.

It is believed that there are two factors or characteristics of junction transistors which make the forward emitter-to-base voltage sensitive to temperature as mentioned above. One of these factors is the base saturation current of the transistor, that is, the base current that flows for collector saturation. Changes of temperature will also change the base saturation current. The other of these factors is the so-called zero voltage conductance which also changes as the temperature varies. For further explanation of this factor, reference is made to volume 83 of the "Physical Review," July 1, 1951, pages 151 to 162. The zero voltage conductance factor may be considered, for purposes of explanation, to be somewhat similar to the perveance coefficient as employed in electron tube studies.

In one known method of temperature compensation, a temperature responsive device, having a temperature coefficient substantially identical with that of the transistor, is utilized to establish the bias voltage between the base and emitter of the transistor. The temperature responsive device may be, for example, a germanium diode. While such a method is effective, it does not completely compensate for changes of base saturation current, particularly at elevated temperatures, and does not, therefore, furnish optimum bias at elevated temperatures.

Accordingly, it is an object of the present invention to provide an improved semi-conductor signal conveying circuit wherein means are provided for stabilizing the circuit with temperature variations.

It is another object of the present invention to provide an improved signal conveying circuit utilizing transistors as the amplifying elements thereof wherein temperature sensitive variable bias voltages are provided for the transistors.

It is a further object of the present invention to provide an improved temperature sensitive bias voltage supply circuit for a semi-conductor signal translating or amplifying device which provides stable and efficient operation over a wide range of ambient temperatures.

These and further objects and advantages are achieved, in general, by utilizing a pair of temperature responsive devices to establish and control the bias conditions between the base and emitter electrodes of one or more transistors. The temperature responsive devices may, for example, be germanium diodes. In this manner, compensation for temperature variations is achieved, and the optimum base-to-emitter bias of the transistors is maintained.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 2:
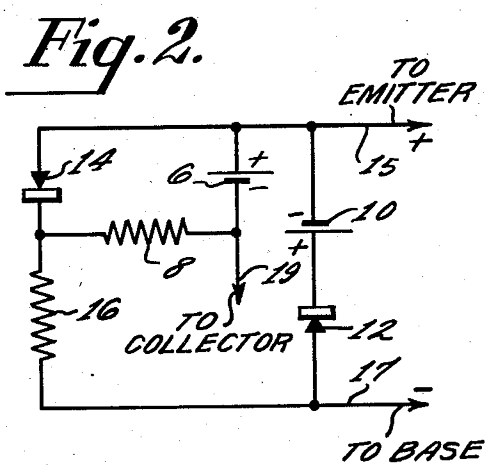
Figure 4:
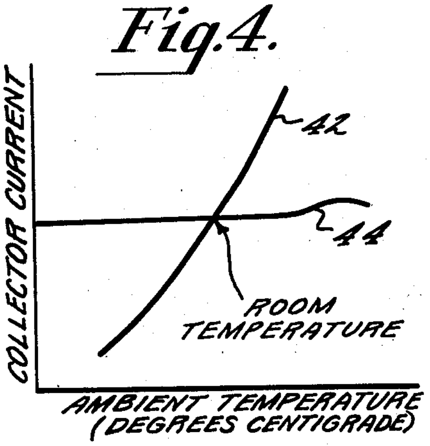
Figure 5:
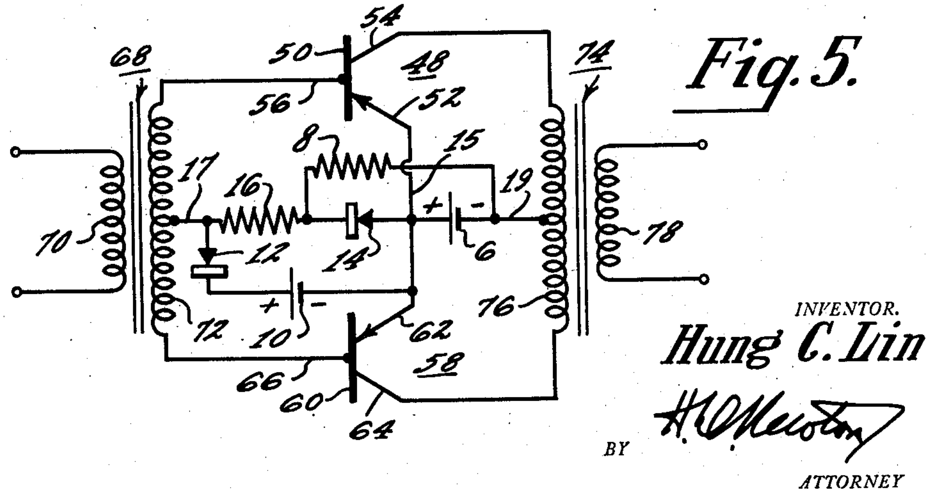

Figure 4 is a graph showing curves relating transistor collector current to ambient temperature for an uncompensated and a compensated condition of operation as a signal translating device; and Figure 5 is a schematic circuit diagram illustrating the use of a bias voltage supply circuit of the type shown in Figure 2 in connection with a class B transistor amplifier in accordance with the invention.

Figure 1:
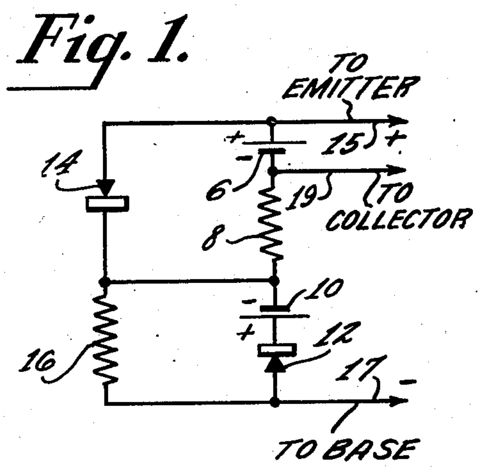
Figures 1 and 2 are schematic circuit diagrams of transistor bias voltage supply circuits in accordance with the invention.

Referring now to the drawing wherein like parts are designated by like reference numerals throughout the figures, and referring particularly to Figure 1, a bias voltage supply circuit for use with transistors includes a unilateral conducting device or control element which is temperature responsive such as illustrated by a germanium junction diode 14 which is connected in series with a resistor 16. Connected in parallel with the diode 14 and the resistor 16 is the series combination of a battery 6, a resistor 8, a battery 10 poled in an opposite direction to the battery 6, and a second unilateral conducting device or control element which is temperature responsive such as the germanium junction diode 12. The bias voltage supply circuit is completed by a connection from the junction of the diode 14 and the resistor 16 to a point intermediate the resistor 8 and the battery 10. As shown, it is seen that the diode 14 is biased in the forward direction with respect to battery 6 while the diode 12 is biased in the reverse direction with respect to battery 10.

As described, a bias voltage supply circuit of the type shown in Figure 1 may be used to provide a temperature sensitive base-to-emitter bias voltage for a junction transistor of N-type conductivity. This may be accomplished by connecting the lead 15 directly to the emitter of the transistor, the lead 17 with the base of the same transistor and the lead 19 with the collector. By this expedient, an optimum base-to-emitter forward bias voltage for the transistor will be derived from the bias voltage supply circuit as will be seen from the ensuing description.

Experimental evidence indicates, as was explained before, that there are two factors or characteristics which make the forward emitter-to-base voltage of a transistor sensitive to temperature. One of these factors is the so-called zero voltage conductance of the transistor which changes as the temperature changes.

Any change in the zero voltage conductance of the transistor will be compensated for by the changes in voltage across the diode 14. For this purpose, the diode 14 is preferably chosen so that its temperature characteristics are substantially the same as the temperature characteristics of the transistor with which it is associated. Preferably, for this purpose, the diode should be of the same material as the transistor. The use of a diode, such as the diode 14 for this purpose is described and claimed in a copending application by L. E. Barton, Serial No. 370,010, filed on July 24, 1953, now abandoned and for which a continuation application Serial No. 598,586 was filed July 18, 1956. In operation, the reverse saturation current of the diode 12 flows through the loop comprising the resistor 16, the battery 10 and the diode 12. The reverse saturation current is defined as the current flowing through the diode upon application of a reverse voltage, which current remains substantially constant with changes in voltage within a predetermined range. The reverse saturation current flow, as is well known and understood, increases with temperature. Moreover, at low temperatures there is very little and substantially no flow of reverse saturation current.

Accordingly, when the ambient temperature is low there is very little and substantially no reverse saturation current flow through the resistor 16. Thus, the voltage drop across the resistor 16 due to the flow of this current is practically zero at low temperature. Hence, the direct current voltage between the leads 15 and 17 is essentially the voltage which exists across the diode 14. The diode 14 is constant current fed through the resistor 8, which has a relatively high resistance. When the diode 14 and the transistor with which it is associated are of the same material, the change in zero voltage conductance of the diode and the transistor with respect to temperature will be the same. Thus the voltage across the diode 14 changes substantially in proportion to the change of zero voltage conductance of the transistor and will decrease due to a decrease in the impedance of the diode 14 as the temperature increases. Thus, a temperature sensitive bias voltage at the lower temperatures is derived across the leads 15 and 17 and is available for application between the base and the emitter of a transistor.

The other factor or characteristic of transistors which makes the optimum bias voltage temperature sensitive is the base saturation current of the transistor, particularly at temperatures higher than those at which the diode 14 will provide satisfactory compensation. The base saturation current flows through the base lead of the transistor. Since the base lead of the transistor has resistance, a voltage drop is created across this resistance due to the flow of base saturation current which creates an internal forward bias for the transistor. Furthermore, the base saturation current increases with increases in temperature. Hence, an internal bias which varies with temperature is established by the variations of base saturation current flow. It is in this manner that the bias for the transistor varies with temperature causing unstable operation.

By provision of the present invention, however, a bias voltage supply circuit supplies a bias voltage for a transistor which also compensates for variations of base saturation current flow of the transistor with temperature changes. In this regard it should be noted that the bias applied to the transistor will be equal to the bias voltage applied across its electrodes from the external biasing source increased by the voltage drop across the base lead resistance due to the flow of base saturation current. As was pointed out hereinbefore, the reverse saturation current of a diode, as well as the base saturation current of a transistor, increases with increases in temperature. Consequently, the flow of diode reverse saturation current through the diode 12 and hence the resistor 16 will increase with temperature. The voltage drop across the resistor 16 due to the flow of diode reverse saturation current will be in a direction to oppose the bias created by the flow of base saturation current through the base lead resistance of the transistor. That is, the voltage drop across the resistor 16 will be in a direction which tends to apply a reverse bias between the emitter and base of the transistor or in other words tends to make the lead 17 more positive. Accordingly, by properly choosing the resistance value of the resistor 16, the forward bias which is established between the emitter and base electrodes due to the flow of base saturation current is compensated for by the reverse bias created by the diode reverse saturation current flowing in the resistor 16.

For the purpose of illustrating the present invention the polarities of the voltage supply circuits have all been shown as proper for transistors of N-type conductivity. It should be understood, however, that voltage supply circuits embodying the invention which are suitable for opposite conductivity type transistors may be constructed by reversing the polarity of the batteries and diodes in all the figures of the drawing. It should also be noted that the temperature responsive diodes may be selected to be of silicon or other semi-conductive materials as well as germanium, particularly if silicon transistors are used. Preferably, however, the diodes are chosen to consist of the same material as the transistors with which they are associated.

In most cases, it is more convenient for actual circuit applications if the biasing battery or batteries are not floating. To this end, as shown in Figure 2, the biasing batteries 6 and 10 are connected together. Accordingly, the resistor 8 and the battery 6 are connected in series from the junction of the diode 14 and the resistor 16 to the negative terminal of the battery 10. Thus, the battery arrangement for a circuit of the type illustrated in Figure 2 is somewhat more convenient than the arrangement in Figure 1.

In other respects, the circuit illustrated in Figure 2 is seen to be identical with the circuit illustrated in Figure 1 and provides a temperature sensitive bias in the same manner. Accordingly, changes in the zero voltage conductance of the transistor with which the circuit is associated will be compensated for by the changes in voltage across the diode 14. Moreover, since the diode reverse saturation current through the diode 12 is independent of its terminal voltages, the voltage developed across the resistor 16 due to the flow of this current will vary with temperature in the same manner as in Figure 1. Consequently, a voltage bias supply circuit of the type illustrated in Figure 2 is capable of supplying a transistor with a temperature sensitive bias voltage. Thus, by using a circuit of the type illustrated in Figure 2 in combination with a transistor, compensation for temperature variations over a wide range will be easily and effectively achieved. Hence, stable and substantially distortion-free operation will be realized.

Figure 3:
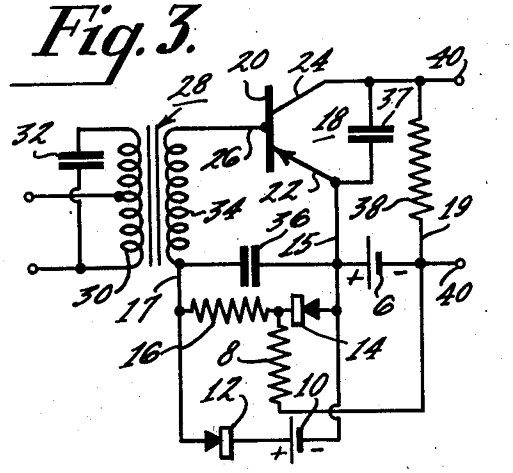
Figure 3 is a schematic circuit diagram illustrating the use of a bias voltage supply circuit of the type shown in Figure 2 in connection with a transistor detector in accordance with the invention.

A voltage bias supply circuit constructed in accordance with the invention may be used to provide a temperature sensitive bias for a transistor detector. Such an application of the present invention is illustrated in Figure 3, reference to which is now made. The transistor detector 18 includes a semi-conductive body 20 which is, by way of example only, of the P-N-P junction type and three contacting electrodes which are designated as an emitter 22, a collector 24 and a base 26. The input circuit for the transistor 18 includes the secondary winding 34 of an input transformer 28, the upper end of which is connected directly with the base 26 of the transistor 18. The lower end of the secondary winding 34 is connected through a capacitor 36 to the emitter 22 of the transistor 18. The input transformer 28 also includes a primary winding 30 which which is connected a tuning capacitor 32 in parallel.

The output circuit for the transistor 18 includes a by-pass capacitor 37 which is connected between the collector 24 and the emitter 22 of the transistor. A load resistor 38 is connected at one end to the collector 24 and at the other end to the negative terminal of the biasing battery 6 which is part of a bias voltage supply circuit of the type illustrated in Figure 2. Output signals which are a reproduction of the modulation envelope of the applied signal may be taken from a pair of terminals 40 which are connected respectively with either end of the load resistor 38.

The bias voltage supply circuit for the transistor detector 18, in accordance with the invention, is identical with the one shown in Figure 2. Thus, the lead 17 is connected through the secondary winding 34 of the input transformer 28 to the base 26 and the lead 15 is connected directly with the emitter 22. In addition, the lead 19 is connected to the lower end of the load resistor 38.

By using a bias voltage supply circuit of the type illustrated in Figure 2 to supply a temperature sensitive bias for a transistor detector as shown in Figure 3, compensation for temperature variations is achieved. This is accomplished in the same manner as that already described in connection with Figures 1 and 2. Hence, changes in the zero voltage conductance of the transistor 18 will be compensated for by the changes in voltage across the diode 14. In addition the voltage which is developed across the resistor 16 due to the flow of diode reverse saturation current will vary with temperature in such a manner as to compensate for the bias created by the flow of base saturation current through the base lead resistance of the transistor 18. Consequently, a transistor detector 18 is supplied with a temperature sensitive bias voltage permitting stable and substantially distortion-free operation of the detector.

The improved performance of a circuit constructed in accordance with the invention can be depicted graphically. This is shown in Figure 4 where two curves have been plotted, the curve 42 representing the collector current variations with ambient temperature variations for an uncompensated transistor detector, and the curve 44 representing the collector current variations with ambient temperature variations for a compensated detector of the type illustrated in Figure 3. It is readily apparent, of course, that the collector current for the uncompensated stage varies widely as the temperature changes while the collector current remains substantially constant over a wide range of temperatures for a stage compensated for in accordance with this invention.

A bias voltage supply circuit of the type illustrated in Figure 2 may also be used to supply a temperature sensitive bias for a class B amplifier. This is shown in Figure 5, reference to which is now made. The class B amplifier is connected for push-pull operation and comprises a pair of transistors 48 and 58. The transistor 48 includes a semi-conductive body 50 which is, by way of example, of the P-N-P junction type having three contacting electrodes which are designated as an emitter 52, a collector 54 and a base 56. In the same manner, the transistor 58 also includes a semi-conductive body 60 which has been chosen to be of the P-N-P junction type and three contacting electrodes which are an emitter 62, a collector 64 and a base 66. The emitters 52 and 62 are connected together in common as shown.

The input circuit for the push-pull transistors includes an input transformer 68 which has a primary winding 70 and a secondary winding 72. One end of the secondary winding 72 is connected directly with the base 56 of one push-pull transistor 48 and the other end of the secondary winding is connected directly with the base 66 of the other push-pull transistor 58. An output circuit for the push-pull transistors 48 and 58 includes a transformer 74 having a primary winding 76 and a secondary winding 78. One end of the primary winding 76 is connected directly with the collector 54 of the first push-pull transistor 48, while the other end of the primary winding is connected directly with the collector 64 of the other push-pull transistor 58.

A temperature sensitive bias voltage for the push-pull transistors 48 and 58 is provided by deriving that voltage from a bias voltage supply circuit of the type illustrated in Figure 2 of the drawing. To this end, and in accordance with the novel features of the present invention, the lead 15 of this circuit is connected with the emitters 52 and 62, respectively. Further, the lead 17 of the bias voltage supply circuit is connected to a center tap on the secondary winding 72 of the input transformer 68. The connections are completed by connecting the lead 19 with a center tap on the primary winding 76 of the output transformer 74.

In operation, a temperature sensitive bias voltage is supplied to the push-pull transistors 48 and 58 in the same manner as described hereinbefore. Accordingly, changes in the zero voltage conductance of both transistors 48 and 58 will be compensated for by the changes in voltage across the diode 14. In addition, the voltage which is developed across the resistor 16 due to the flow of diode reverse saturation current will vary with temperature in such a manner as to compensate for the bias created by the flow of base saturation current through the base lead resistances of the transistors 48 and 58. Consequently, the transistor push-pull amplifier circuit is supplied with a temperature sensitive bias voltage. As a result, stable operation is achieved and a substantially distortion-free push-pull output signal may be derived across the output transformer 74.

It should be apparent that the present invention is applicable to other classes of operation and other circuit arrangements—the ones illustrated being by way of example only. It should also be apparent that by provision of the present invention, stabilization of signal conveying circuits employing transistors with temperature variations is easily and effectively accomplished. Accordingly, stable and efficient operation is achieved over a wide range of temperatures.

What is claimed is:

1. In a signal conveying system, the combination of at least one signal translating transistor having a base, an emitter, and a collector electrode; input circuit means connected for applying an input signal between said base and emitter electrodes; output circuit means connected for deriving an output signal from said collector electrode; a temperature sensitive variable bias voltage supply circuit connected with said transistor for stabilizing the operation of said transistor with variation in temperature; said supply circuit including a first temperature responsive electrical control element connected between said base and emitter electrodes and poled in said circuit in a direction to apply forward bias between said emitter and base electrodes, means providing a direct-current supply source, means connecting said source with said first control element to bias said control element in the forward direction and provide direct-current flow therethrough, the forward bias voltage provided for said base and emitter electrodes by said first control element being variable and decreasing with increases in temperature, a second temperature responsive control element connected between said base and emitter electrodes, means connecting said supply source with said second control element to bias said second control element in the reverse direction, and an impedance element having resistance connected with said second control element and between said base and emitter electrodes and adapted to be traversed by reverse saturation current of said second control element to provide a reverse bias potential between said emitter and base electrodes which increases with increases in temperature.

2. In a signal conveying system, the combination of a pair of transistors each having a base, an emitter, and a collector electrode; input circuit means connected with said base electrodes for applying an input signal thereto; output circuit means connected with said collector electrodes for deriving a push-pull output signal therefrom; a temperature sensitive variable bias voltage supply circuit connected with said transistors for stabilizing the operation thereof with variation in temperature; said supply circuit including a first temperature responsive electrical control element connected between the base and respective emitter electrodes of each of said transistors and poled in said circuit in a direction to apply forward bias between the emitter and respective base electrodes of each of said transistors, means providing a direct-current supply source, means connecting said source with said first control element to bias said control element in the forward direction and provide direct-current flow therethrough, the forward bias voltage provided for the base and emitter electrodes of each of said transistors by said first control element being variable and decreasing with increases in temperature, a second temperature responsive control element connected between the base and respective emitter electrodes of each of said transistors, means connecting said supply source with said second control element to bias said second control element in the reverse direction, and a resistor connected with said second control element and between the base and respective emitter electrodes of each of said transistors and adapted to be traversed by reverse saturation current of said second contral element to provide a reverse bias potential between the emitter and base electrodes of each of said transistors which increases with increases in temperature.

3. In a signal conveying system, the combination of at least one signal translating transistor having a base, an emitter, and a collector electrode; input circuit means connected for applying an input signal between said base and emitter electrodes; output circuit means connected for deriving an output signal from said collector electrode; a temperature sensitive variable bias voltage supply circuit connected with said transistor for stabilizing the operation of said transistor with variation in temperature; said supply circuit including a first temperature responsive semi-conductor diode connected between said base and emitter electrodes and poled in said circuit in a direction to apply forward bias between said emitter and base electrodes, means providing a direct-current supply source, means connecting said source with said first diode to bias said diode in the forward direction and provide direct-current flow therethrough, the forward bias voltage provided for said base and emitter electrodes by said first diode being variable and decreasing with increases in temperature, a second semi-conductor diode connected between said base and emitter electrodes, means connecting said supply source with said second diode to bias said second diode in the reverse direction, and a resistor connected with said second diode and adapted to be traversed by reverse saturation current of said second diode to provide a reverse bias potential between said emitter and base electrodes which increases with increases in temperature, said first diode and said resistor being connected in series between said base and emitter electrodes, the series combination of said first diode and said resistor being connected in parallel with said second diode and a portion of said supply source.

4. In a signal conveying system, the combination of at least one signal translating transistor having a base, an emitter, and a collector electrode; input circuit means connected for applying an input signal between said base and emitter electrodes; output circuit means connected for deriving an output signal from said collector electrode; a temperature sensitive variable bias voltage supply circuit connected with said transistor for stabilizing the operation of said transistor with variation in temperature; said supply circuit including a first temperature responsive electrical control element and a first resistor connected in series in the order named between said emitter and base electrodes, means providing a first direct-current supply source, a second resistor connected in series with said first supply source, the series combination of said first source and said second resistor being connected in the order named between said emitter electrode and the junction of said first control element and said first resistor to bias said first control element in the forward direction, said first control element being poled in said circuit to apply a forward bias voltage between the emitter and base electrodes of said transistor which decreases with increases in temperature, a second temperature responsive control element, and means providing a second direct-current supply source connected with said second control element and poled in said circuit to bias said second control element in the reverse direction, said second supply source and said second control element being connected in series in the order named between said emitter and base electrodes, the series combination of said second supply source and said second control element being connected in parallel with said first control element and said first resistor whereby said first resistor is traversed by reverse saturation current flow of said second control element to provide a reverse bias potential between said emitter and base electrodes which increases with increases in temperature.

5. In a signal conveying system, the combination of at least one signal translating transistor having a base, an emitter, and a collector electrode; input circuit means connected for applying an input signal between said base and emitter electrodes; output circuit means connected for deriving an output signal from said collector electrode; a temperature sensitive variable bias voltage supply circuit connected with said transistor for stabilizing the operation of said transistor with variation in temperature; said supply circuit including a first temperature responsive electrical control element and a first resistor connected in series in the order named between said emitter and base electrodes, means providing a first direct current supply source, a second resistor connected in series with said first supply source, the series combination of said first source and said second resistor being connected in the order named between said emitter electrode and the junction of said first control and said first resistor to bias said first control element in the forward direction, said first control element being poled in said circuit to apply a forward bias voltage between the emitter and base electrodes of said transistor which decreases with increases in temperature, a second temperature responsive control element, and means providing a second direct-current supply source connected with said second control element and poled in said circuit to bias said second control element in the reverse direction, said second control element and second supply source being connected in series in the order named between said base electrode and the junction of said first and second resistors whereby said first resistor is traversed by reverse saturation current flow of said second control element to provide a reverse bias potential between the emitter and base electrodes of said transistor which decreases with increases in temperature.

(References on following page)

References Cited in the file of this patent

UNITED STATES PATENTS

| | | |
|---|---|---|
| 2,644,896 | Lo | July 7, 1953 |
| 2,691,073 | Lowman | Oct. 5, 1954 |

OTHER REFERENCES

Alexanderson article, Proc. of IRE, November 1952, pp. 1508–1511.

Shea text, "Principles of Transistor Circuits," pp. 177–179, published 1953, by John Wiley and Sons, Inc., New York City.